(12) United States Patent
Nakade et al.

(10) Patent No.: US 9,714,622 B2
(45) Date of Patent: Jul. 25, 2017

(54) VEHICLE SPEED LIMIT APPARATUS (71) Applicant: TOYOTA JIDOSHA KABUSHIKI KAISHA, Toyota-shi, Aichi-ken (JP)

(72) Inventors: Yusuke Nakade, Nagoya (JP); Yoshihide Nakane, Okazaki (JP); Kazuaki Sumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 15/070,753

(22) Filed: Mar. 15, 2016

(65) Prior Publication Data
US 2016/0281621 A1    Sep. 29, 2016

(30) Foreign Application Priority Data

Mar. 26, 2015 (JP) .................................. 2015-065174

(51) Int. Cl.
*F02D 41/10* (2006.01)
*F02D 29/02* (2006.01)
(Continued)

(52) U.S. Cl.
CPC ............ *F02D 41/10* (2013.01); *B60W 30/146* (2013.01); *F02D 29/02* (2013.01); *B60K 2031/0091* (2013.01); *B60W 2520/10* (2013.01); *B60W 2520/105* (2013.01); *B60W 2530/16* (2013.01); *B60W 2540/10* (2013.01); *B60W 2720/10* (2013.01)

(58) Field of Classification Search
CPC ...... F02D 41/10; F02D 29/02; B60W 30/146; B60W 2530/16; B60W 2720/10; B60W 2520/10; B60W 2520/105; B60W 2540/10; B60K 2031/0091
USPC ................................. 123/436; 701/103, 110
See application file for complete search history.

(56) References Cited

U.S. PATENT DOCUMENTS

| 8,374,762 B2 * | 2/2013 | Sen ......................... B60K 31/00 180/170 |
| 8,396,640 B2 * | 3/2013 | Yuzawa ................. B60W 10/06 701/93 |

(Continued)

FOREIGN PATENT DOCUMENTS

| EP | 2803548 A1 | 11/2014 |
| JP | 2010-077960 A | 4/2010 |

(Continued)

*Primary Examiner* — Hai Huynh
(74) *Attorney, Agent, or Firm* — Oliff PLC (57) ABSTRACT

A vehicle speed limit apparatus includes a demand value calculation part configured to calculate a demand value according to an accelerator opening degree, a limit vehicle speed acquisition part configured to obtain a limit vehicle speed, an upper limit value calculation part configured to calculate an upper limit value based on a limit acceleration, a selection part configured to select the smaller of the demand value and the upper limit value, a control part configured to control a drive force generation apparatus, and an upper limit value correction part configured to correct the upper limit value based on a current acceleration and the limit acceleration when the selected value corresponds to the upper limit value, and to correct the upper limit value based on the current acceleration and the demand value when the selected value corresponds to the demand value.

5 Claims, 8 Drawing Sheets

(51) Int. Cl.
*B60W 30/14* (2006.01)
*B60K 31/00* (2006.01)

(56) References Cited

U.S. PATENT DOCUMENTS

| | | |
|---|---|---|
| 2011/0160978 A1 | 6/2011 | Yuzawa et al. |
| 2015/0353090 A1* | 12/2015 | Yoshino ................ B60W 10/04 |
| | | 701/54 |
| 2016/0281620 A1* | 9/2016 | Nakade ............... B60W 30/146 |

FOREIGN PATENT DOCUMENTS

| | | |
|---|---|---|
| JP | 2013-100787 A | 5/2013 |
| JP | 2016-078677 A | 5/2016 |
| WO | 2016/059753 A1 | 4/2016 |

\* cited by examiner

to the vehicle speed limit drive force.

VEHICLE SPEED LIMIT APPARATUS

CROSS REFERENCE TO RELATED APPLICATION

The present application is based on and claims the benefit of priority of Japanese Priority Application No. 2015-065174, filed on Mar. 26, 2015, the entire contents of which are hereby incorporated by reference.

FIELD

The disclosure is related to a vehicle speed limit apparatus.

BACKGROUND

Japanese Laid-open Patent Publication No. 2010-077960 discloses a technique for controlling an electronic throttle valve by selecting, when a driver demand drive force (i.e., a drive force demanded by the driver and calculated based on an accelerator opening degree) is greater than a target drive force for limiting vehicle speed, the smaller of these two, that is to say, the target drive force for limiting vehicle speed, so that actual vehicle speed does not exceed a limit vehicle speed.

Here, a configuration is assumed in which an acceleration for limiting vehicle speed (referred to as "vehicle speed limit acceleration", hereinafter) is calculated based on a difference between actual vehicle speed and limit vehicle speed, a target drive force for limiting vehicle speed (referred to as "vehicle speed limit drive force", hereinafter) is calculated based on the vehicle speed limit acceleration, a driver demand drive force is calculated based on an accelerator opening degree, and a drive force is controlled based on the smaller of the vehicle speed limit drive force and the driver demand drive force. In other words, when the driver demand drive force is greater than the vehicle speed limit drive force, the drive force is limited to the vehicle speed limit drive force.

Here, a state in which the vehicle speed limit drive force is smaller than the driver demand drive force and thus the drive force is controlled based on the vehicle speed limit drive force is referred to as "a limit state", and a state in which the vehicle speed limit drive force is greater than the driver demand drive force and thus the drive force is controlled based on the driver demand drive force is referred to as "a non-limit state".

The vehicle speed limit drive force is calculated based on the vehicle speed limit acceleration; however, in order to reduce a probability that the actual vehicle speed exceeds the limit vehicle speed, it is necessary to correct the vehicle speed limit drive force based on a traveling circumstance. Because the drive force is controlled based on the vehicle speed limit drive force in the limit state, the vehicle speed limit drive force can be corrected based on a difference between an actual acceleration and the vehicle speed limit acceleration. However, because the drive force is controlled based on the driver demand drive force in the non-limit state, the vehicle speed limit drive force cannot be corrected based on a difference between an actual acceleration and the vehicle speed limit acceleration. This is because in the non-limit state the actual acceleration is not an acceleration that is achieved as a result of controlling the drive force based on the vehicle speed limit acceleration but instead is an acceleration that is achieved as a result of controlling the drive force based on the driver demand drive force.

For this reason, in the non-limit state the vehicle speed limit drive force cannot be corrected based on the traveling circumstance. If the vehicle speed limit drive force is corrected based on the traveling circumstance in the non-limit state, the vehicle speed limit drive force may exceed an appropriate value under a certain traveling circumstance, which may cause the actual vehicle speed to exceed the limit vehicle speed. Further, the vehicle speed limit drive force may fall below an appropriate value under another circumstance, which may cause the drive force to be excessively limited, which in turn causes the driver to feel strange.

Therefore, it is an object of one aspect of the disclosure to provide a vehicle speed limit apparatus that calculates an upper limit value in a non-limit state based on a current drive force generated by a drive force generation apparatus, thereby increasing smoothness of a transition from the non-limit state in which a demand value is selected to a limit state in which the upper limit value is selected.

SUMMARY

According to an aspect of the disclosure, a vehicle speed limit apparatus is provided, which includes:

a demand value calculation part configured to calculate a demand value according to an accelerator opening degree, the demand value being related to a drive force;

a limit vehicle speed acquisition part configured to obtain a limit vehicle speed;

an upper limit value calculation part configured to calculate an upper limit value based on a limit acceleration, the limit acceleration being determined according to a vehicle speed difference between the limit vehicle speed and a current vehicle speed, the upper limit value being related to a drive force;

a selection part configured to select a value, the value being the smaller of the demand value and the upper limit value;

a control part configured to control a drive force generation apparatus to generate the drive force corresponding to the selected value; and an upper limit value correction part configured to correct the upper limit value (i) based on a current acceleration and the limit acceleration when the selected value corresponds to the upper limit value, and (ii) based on the current acceleration and the demand value when the selected value corresponds to the demand value.

DESCRIPTION OF EMBODIMENTS

In the following, embodiments will be described with reference to the accompanying drawings.

Figure 1:
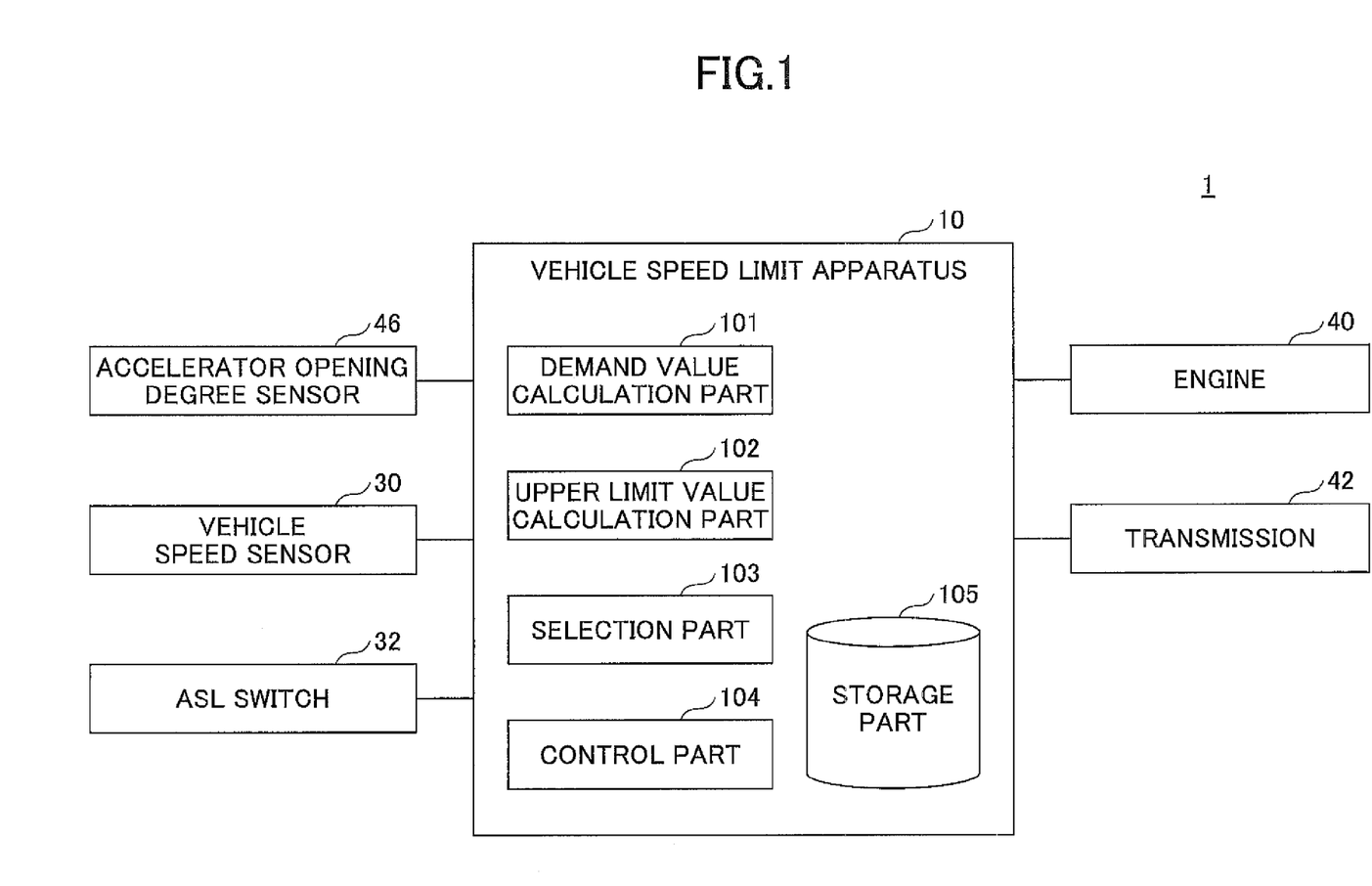
FIG. 1 is a diagram illustrating an example of a vehicle control system including a vehicle speed limit apparatus according to an embodiment.

FIG. 1 is a diagram illustrating an example of a vehicle control system 1 including a vehicle speed limit apparatus 10 according to an embodiment.

The vehicle control system 1 includes the vehicle speed limit apparatus 10. The vehicle speed limit apparatus 10 includes an ECU (Electronic Control Unit), which can be implemented as a micro-computer having a CPU, ROM and RAM.

The vehicle speed limit apparatus 10 includes an ASL (Adjustable Speed Limiter) function.

The vehicle speed limit apparatus 10 is coupled to a vehicle speed sensor 30 that detects vehicle speed, an ASL switch 32, and an accelerator opening degree sensor 46 that detects an accelerator opening degree (i.e., an accelerator operation amount). The vehicle speed sensor 30 includes vehicle wheel speed sensors that are respectively provided in a plurality of wheels. In this case, the vehicle speed is calculated based on an average value of the detection values of the vehicle wheel speed sensors, for example.

The vehicle speed limit apparatus 10 includes a demand value calculation part 101, an upper limit value calculation part 102, a selection part 103, a control part 104, and a storage part (memory) 105.

The demand value calculation part 101 calculates a demand value according to the accelerator opening degree from the accelerator opening degree sensor 46. For example, the demand value calculation part 101 calculates the demand value related to the drive force based on the accelerator opening degree and the vehicle speed. The demand value related to the drive force may be a demand value for the drive force itself, or a demand value related to acceleration, throttle opening degree, drive torque, etc. In the following, as an example, the demand value related to the drive force is a demand value for the drive force itself, and is referred to as "a driver demand drive force".

The upper limit value calculation part 102 calculates the upper limit value related to the drive force based on a limit vehicle speed. The limit vehicle speed is a fixed value. Alternatively, the limit vehicle speed is set by the driver. Alternatively, the limit vehicle speed is automatically set as is the case with ISA (Intelligent Speed Assistance). For example, the limit vehicle speed is set automatically based on limit speed information which can be obtained by communication with an external facility (including central server) such as an infrastructure and represents the limit speed with respect to the road on which the vehicle is currently traveling. Further, for example, the limit vehicle speed is set automatically based on limit speed information of road sign which may be image-recognized using vehicle-installed camera or the like.

The upper limit value related to the drive force may be an upper limit value for the drive force itself, or an upper limit value related to the acceleration, the throttle opening degree, the drive torque, etc., as is the case with the demand value for the drive force. In the following, as an example, the upper limit value related to the drive force is an upper limit value for the drive force itself, and is referred to as "an upper limit drive force". A further function of the upper limit value calculation part 102 is described hereinafter.

The selection part 103 selects the smaller of the driver demand drive force calculated by the demand value calculation part 101 and the upper limit drive force calculated by the upper limit value calculation part 102. For example, the selection part 103 selects the upper limit drive force if the driver demand drive force is greater than or equal to the upper limit drive force, or otherwise selects the driver demand drive force. In the following, the drive force selected by the selection part 103 is referred to as "a target drive force". Further, in the following, a state in which the driver demand drive force is selected by the selection part 103 is referred to as "a non-limit state", and a state in which the upper limit drive force is selected by the selection part 103 is referred to as "a limit state".

The control part 104 controls an engine 40 and a transmission 42 (a combination thereof is an example of a drive force generation apparatus) such that the drive force according to the drive force (i.e., the target drive force) selected by the selection part 103 is generated. For example, the control part 104 determines a target torque of the engine 40 and a target transmission gear ratio of the transmission 42 such that the target drive force is generated, and controls the engine 40 and the transmission 42 such that the target torque and the target transmission gear ratio are implemented.

Figure 3:
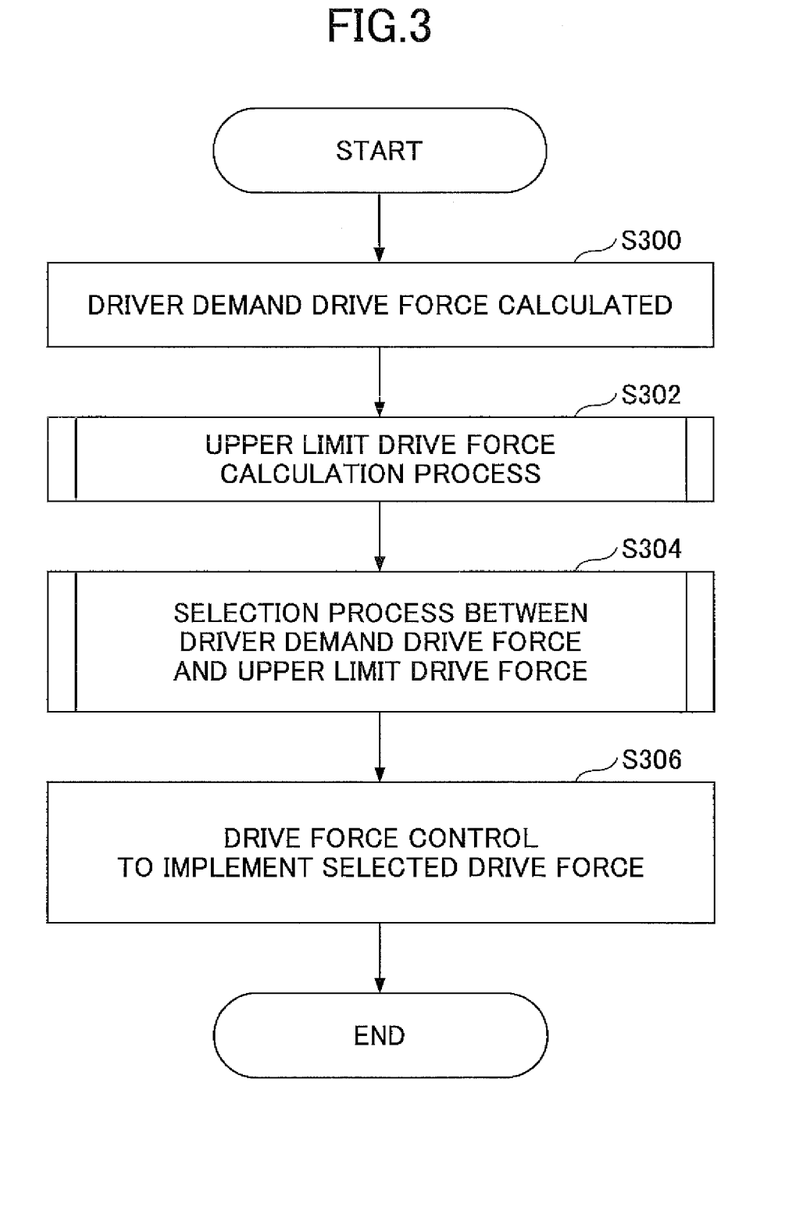
FIG. 3 is a flowchart illustrating an example of a process executed by the vehicle speed limit apparatus.

It is noted that the demand value calculation part 101, the upper limit value calculation part 102, the selection part 103 and the control part 104 operate in a synchronized manner in a cycle (see FIG. 3). Specifically, at a certain cycle, the demand value calculation part 101 and the upper limit value calculation part 102 calculate the driver demand drive force and the upper limit drive force, respectively, the selection part 103 selects the smaller of those two drive forces, and the control part 104 controls the engine 40 and the transmission 42 based on the selected drive force (i.e., the target drive force).

The storage part 105 stores information (information about vehicle weight, and mapped data, etc.) that is to be used for processes of the demand value calculation part 101, etc.

Figure 2:
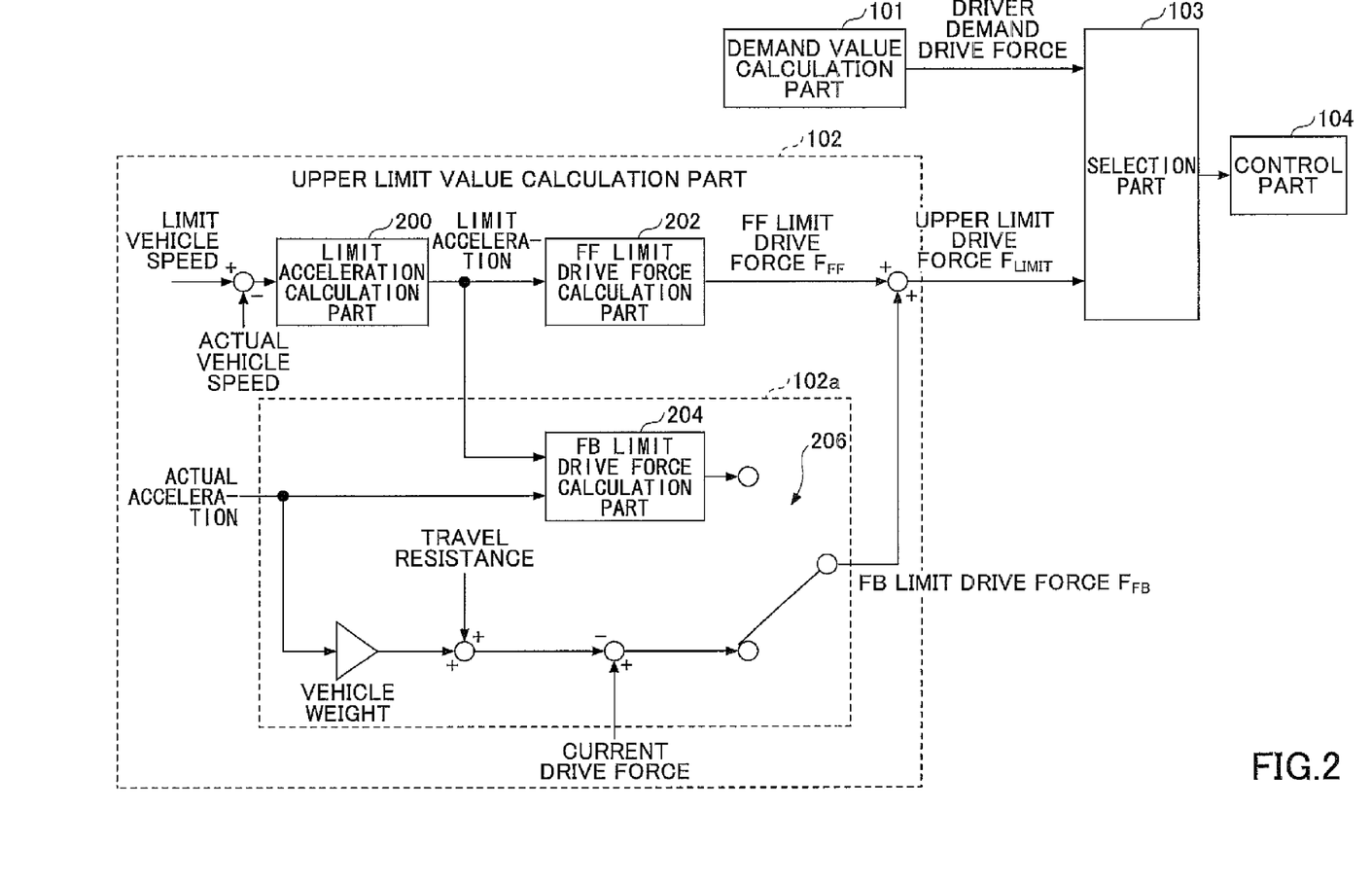
FIG. 2 is a functional block diagram of an upper limit value calculation part.

FIG. 2 is a functional block diagram of the upper limit value calculation part 102. It is noted that in FIG. 2 the demand value calculation part 101, the selection part 103, and the control part 104 are also illustrated.

The upper limit value calculation part 102 uses the limit vehicle speed, an actual vehicle speed, an actual acceleration, a travel resistance, a vehicle weight, and a current drive force. The limit vehicle speed is as described above. The actual vehicle speed (the current actual vehicle speed) is based on the output of the vehicle speed sensor 30. The actual acceleration (the current actual acceleration) is based on a differential value of the output of the vehicle speed sensor 30. The travel resistance is calculated according to the actual vehicle speed, for example. The travel resistance includes a rolling resistance and an air resistance. Mapped data that represents a relationship between the travel resistance and the vehicle speed is stored in the storage part 105. The current drive force is based on the driver demand drive force calculated by the demand value calculation part 101. However, the current drive force may be based on an estimated value of a current output of the engine 40. The estimated value may be derived from an injection amount and an intake air flow, for example. The vehicle weight is based on a designed value and stored in the storage part 105.

The upper limit value calculation part 102 calculates the upper limit drive force based on these input parameters (the limit vehicle speed, the actual vehicle speed, etc.) to output the calculated upper limit drive force to the selection part 103. The upper limit drive force $F_{LIMIT}$ is calculated with the following formula, as illustrated in FIG. 2.

$$\text{Upper limit drive force } F_{LIMIT} = FF \text{ limit drive force } F_{FF} + FB \text{ limit drive force } F_{FB} \quad \text{formula (1)}$$

The limit drive force $F_{FF}$ (an example of a limit value) is referred to as "a FF limit drive force $F_{FF}$" for the sake of distinction between the limit drive force $F_{FF}$ and the limit drive force $F_{FB}$. The FF limit drive force $F_{FF}$ is calculated as follows. At first, a limit acceleration calculation part 200 calculates the limit acceleration based on a difference between the limit vehicle speed and the actual vehicle speed. In this example, the difference between the limit vehicle speed and the actual vehicle speed is derived by subtracting the actual vehicle speed from the limit vehicle speed. The limit acceleration corresponds to a permissible maximum acceleration (i.e., a maximum acceleration permissible in terms of the limit vehicle speed) according to the current actual vehicle speed. Basically, the limit acceleration is calculated such that the limit acceleration becomes greater as the difference between the limit vehicle speed and the actual vehicle speed becomes greater. Next, a FF limit drive force calculation part 202 calculates the FF limit drive force $F_{FF}$ based on the limit acceleration. The FF limit drive force $F_{FF}$ is calculated by adding the travel resistance to a product of the limit acceleration and the vehicle weight, for example.

The limit drive force $F_{FB}$ (an example of a correction value) is referred to as "a FB limit drive force $F_{FB}$" for the sake of distinction between the FF limit drive force $F_{FF}$ and the limit drive force FFB. The FB limit drive force $F_{FB}$ is calculated with a selected one of two following ways. In other words, there are two ways of calculating the FB limit drive force $F_{FB}$. A first calculation way is used at a current cycle when the upper limit drive force is selected by the selection part 103 at the previous cycle. In other words, the first calculation way is used in the limit state. A second calculation way is used at a current cycle when the driver demand drive force is selected by the selection part 103 at the previous cycle. In other words, the second calculation way is used in the non-limit state. The selection between these two ways is schematically illustrated with a switch indicated by a reference numeral 206 in FIG. 2.

According to the first calculation way, as illustrated in FIG. 2, a FB limit drive force calculation part 204 calculates the FB limit drive force $F_{FB}$ based on the difference between the limit acceleration and the actual acceleration. For example, the difference, which is obtained by subtracting the actual acceleration from the limit acceleration, is multiplied by a predetermined gain. Then, the value thus obtained (current value) is added to the previous value (i.e., the values are accumulated over cycles). Then, the accumulated value is multiplied by the vehicle weight to calculate the FB limit drive force $F_{FB}$.

According to the second calculation way, as illustrated in FIG. 2, the FB limit drive force $F_{FB}$ is calculated based on the actual acceleration and the current drive force. Specifically, as illustrated in FIG. 2, the actual acceleration is multiplied by the vehicle weight. Then, the value thus obtained is added to the travel resistance. Then, the value thus obtained is subtracted from the current drive force to calculate the FB limit drive force $F_{FB}$. Specifically, the FB limit drive force $F_{FB}$ is calculated as follows.

FB limit drive force $F_{FB}$=(current drive force)−{(vehicle weight)×(actual acceleration)+(travel resistance)} formula (2)

Here, the FB limit drive force $F_{FB}$ is the difference obtained by subtracting a target value of a force to be acting on the vehicle in the traveling direction from the actual value thereof (calculated by multiplying the vehicle weight by the actual acceleration). Thus, the formula (2) has such a physical meaning that the FB limit drive force $F_{FB}$ is due to a gradient of a road on which the vehicle travels. Specifically, the FB limit drive force $F_{FB}$ becomes substantially 0 when the gradient of the road on which the vehicle travels is 0 (i.e., when the vehicle travels on a flat road. The FB limit drive force $F_{FB}$ has a positive value when the gradient of the road on which the vehicle travels is uphill. The FB limit drive force $F_{FB}$ has a negative value when the gradient of the road on which the vehicle travels is downhill. Thus, according to the second calculation way, even if the gradient of the road on which the vehicle travels is not flat, the FB limit drive force $F_{FB}$, with which the target value of the force (=(current drive force) (travel resistance)) to be acted on the vehicle in its traveling direction is implemented, can be calculated.

According to the configuration illustrated in FIG. 2, the FB limit drive force $F_{FB}$ is calculated in different ways between the case (i.e. the non-limit state) where the driver demand drive force is selected by the selection part 103 at the previous cycle and the case (i.e. the limit state) where the upper limit drive force is selected by the selection part 103 at the previous cycle. Accordingly, the upper limit drive force $F_{LIMIT}$ is calculated in different ways between the case where the driver demand drive force is selected by the selection part 103 at the previous cycle and the case where the upper limit drive force is selected by the selection part 103 at the previous cycle.

It is noted that, in the example illustrated in FIG. 2, a block 102a of the upper limit value calculation part 102, which calculates the FB limit drive force $F_{FB}$, is an example of an upper limit value correction part, and the remainder of the upper limit value calculation part 102 is an example of an upper limit value calculation part. In the example illustrated in FIG. 2, the correction of the upper limit drive force $F_{LIMIT}$ is implemented by adding the FB limit drive force $F_{FB}$ calculated in the block 102a to the FF limit drive force $F_{FF}$.

Figure 4:
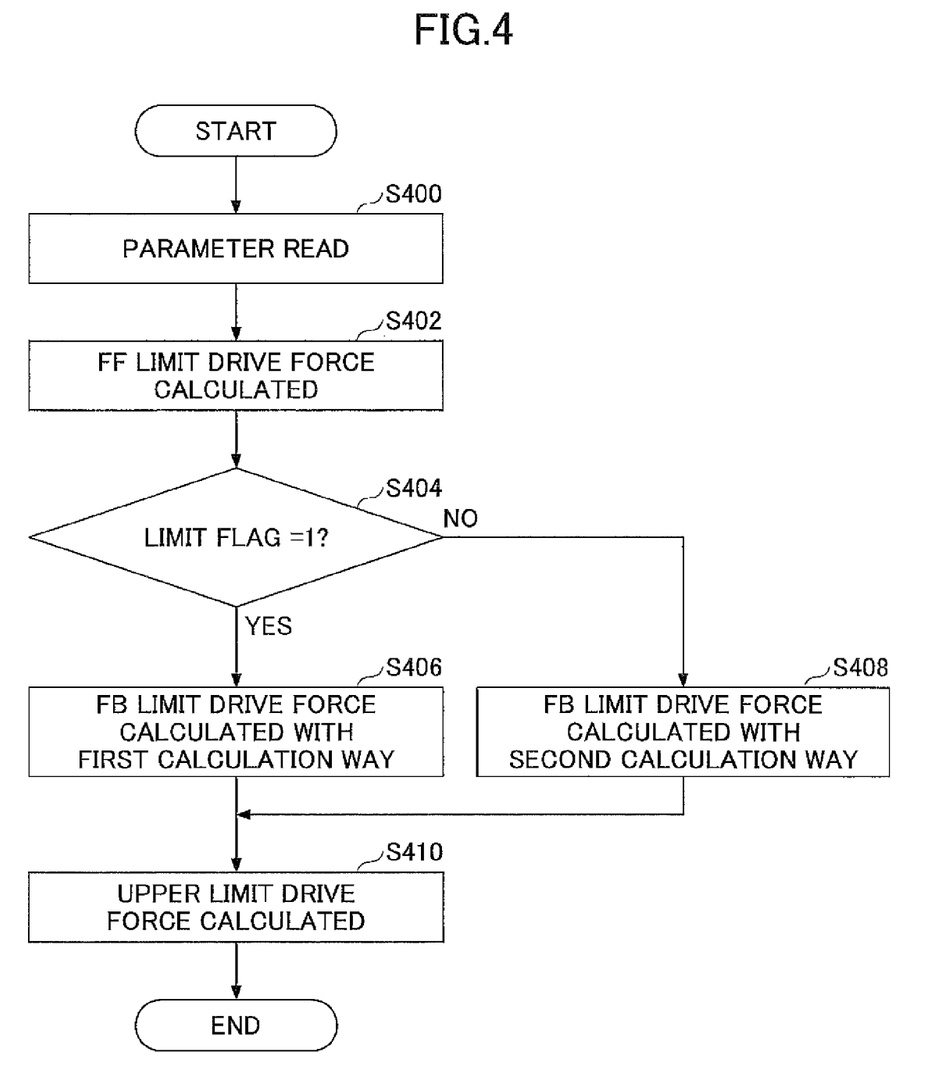
FIG. 4 is a flowchart illustrating an example of an upper limit value calculation process.
Figure 5:
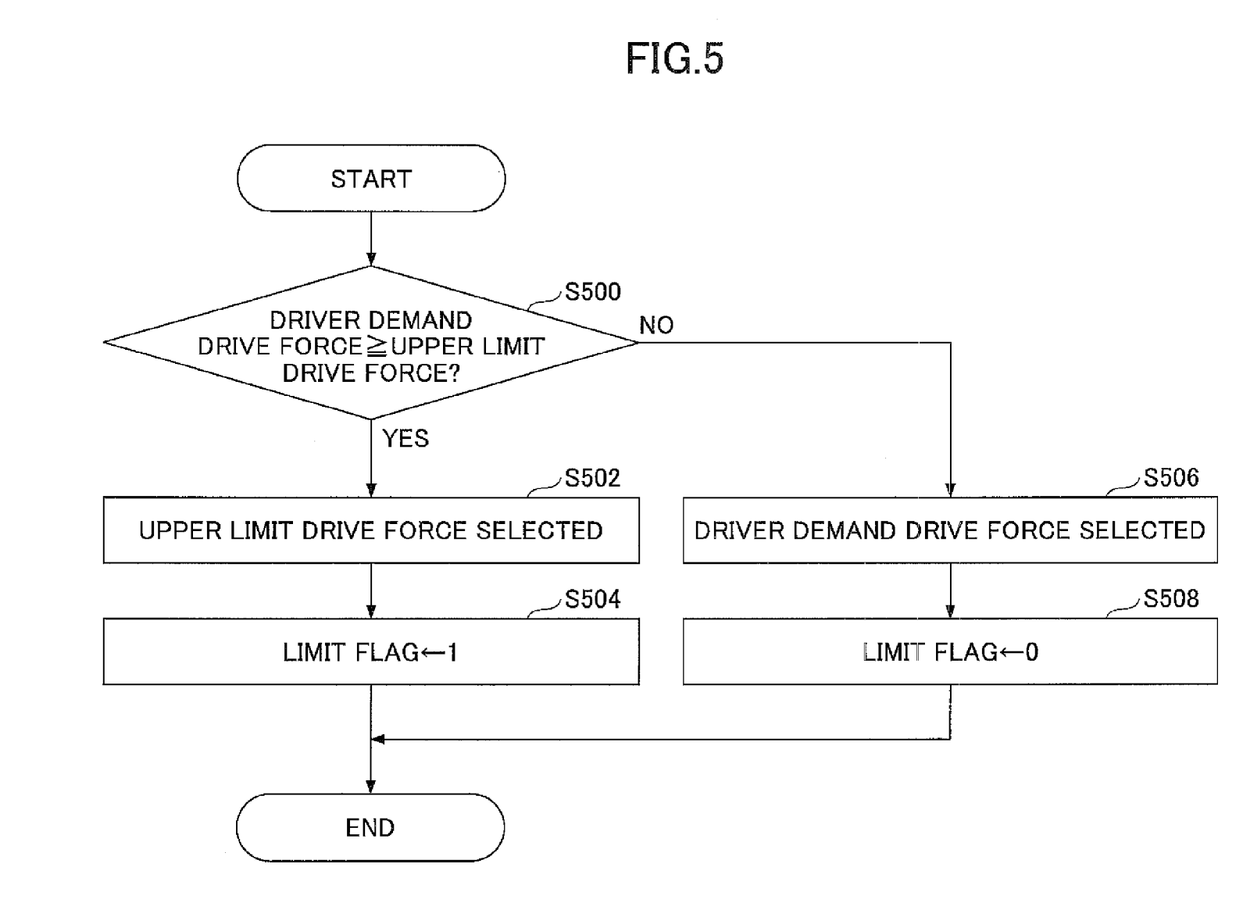
FIG. 5 is a flowchart illustrating an example of a selection process.

Next, with reference to FIG. 3 through FIG. 5, an operation of the vehicle speed limit apparatus 10 is described.

FIG. 3 is an example of a flowchart of a process executed by the vehicle speed limit apparatus 10. The process illustrated in FIG. 3 may be performed at a predetermined cycle during the ON state of the ASL function, for example. It is noted that the ASL function is basically in its ON state when the ASL switch 32 is in its ON state.

In step S300, the demand value calculation part 101 reads the accelerator opening degree and the vehicle speed, and calculates the driver demand drive force based on the read accelerator opening degree and the read vehicle speed.

In step S302, the upper limit value calculation part 102 performs an upper limit drive force calculation process. The upper limit drive force calculation process is described hereinafter with reference to FIG. 4.

In step S304, the selection part 103 performs a selection process for selecting the smaller of the driver demand drive force obtained in step S300 and the upper limit drive force $F_{LIMIT}$ obtained in step S302. The selection process is described hereinafter with reference to FIG. 5.

In step S306, the control part 104 controls the engine 40 and the transmission 42 to generate the drive force corresponding to the drive force (i.e. the target drive force) selected in step S304 is generated.

FIG. 4 is a flowchart illustrating an example of the upper limit value calculation process. In step S400, the upper limit value calculation part 102 reads the limit vehicle speed, the actual vehicle speed, the actual acceleration, the travel resistance, the vehicle weight, and the current drive force. It is noted that the vehicle weight, among these parameters, is a fixed value, and thus may be incorporated in a calculation formula as a constant.

In step S402, the upper limit value calculation part 102 calculates the FF limit drive force $F_{FF}$ based on the parameters read in step S400. The calculation way of the FF limit drive force $F_{FF}$ is as described above.

In step S404, the upper limit value calculation part 102 determines whether a limit flag is "1". The limit flag being "0" is indicative of the non-limit state, and the limit flag being "1" is indicative of the limit state. If the determination result is "YES", the process goes to step S406, and if the determination result is "NO", the process goes to step S408.

In step S406, the upper limit value calculation part 102 calculates the FB limit drive force $F_{FB}$ with the first calculation way based on the parameters read in step S400. The first calculation way is as described above.

In step S408, the upper limit value calculation part 102 calculates the FB limit drive force $F_{FB}$ with the second calculation way based on the parameters read in step S400. The second calculation way is as described above.

In step S410, the upper limit value calculation part 102 calculates, based on the FF limit drive force $F_{FB}$ calculated in step S402 and the FB limit drive force $F_{FB}$ calculated in step S406 or step S408, the upper limit drive force $F_{LIMIT}$. The calculation way of the upper limit drive force $F_{LIMIT}$ is as described above.

According to the process illustrated in FIG. 4, if the limit flag is "1", that is to say, in the case of the limit state, the FB limit drive force $F_{FB}$ is calculated with the first calculation way, and if the limit flag is "0", that is to say, in the case of the non-limit state, the FB limit drive force $F_{FB}$ is calculated with the second calculation way.

FIG. 5 is a flowchart illustrating an example of the selection process.

In step S500, the selection part 103 determines whether the driver demand drive force is greater than or equal to the upper limit drive force $F_{LIMIT}$. If the determination result is "YES", the process goes to step S502, and if the determination result is "NO", the process goes to step S506.

In step S502, the selection part 103 selects the upper limit drive force $F_{LIMIT}$.

In step S504, the selection part 103 sets the limit flag to "1".

In step S506, the selection part 103 selects the driver demand drive force.

In step S508, the selection part 103 sets the limit flag to "0".

According to the process illustrated in FIG. 5, when the upper limit drive force $F_{LIMIT}$ is selected, the limit flag is set to "1", and when the driver demand drive force is selected, the limit flag is set to "0".

Figure 6:
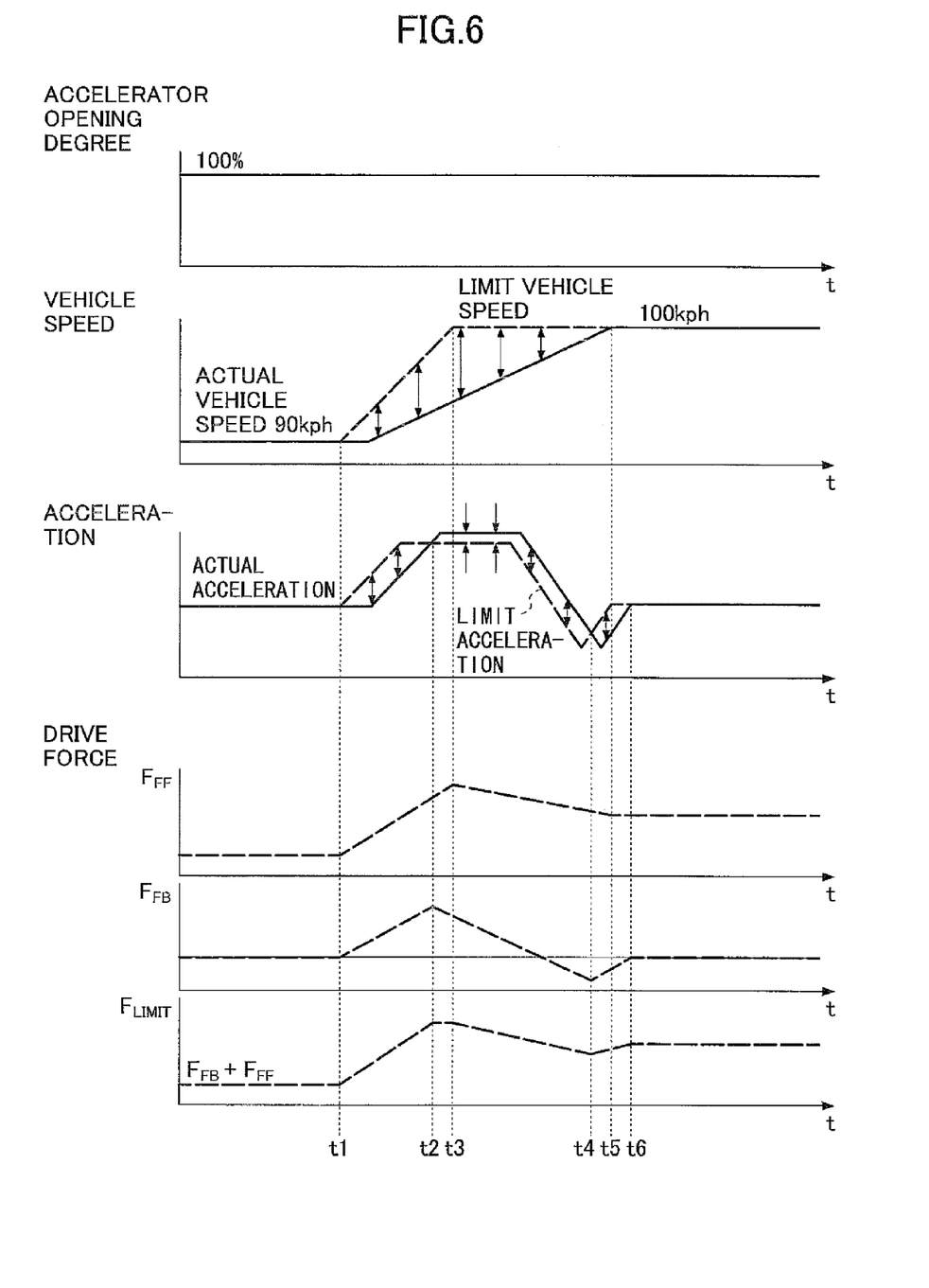
FIG. 6 is a diagram describing a way of calculating an upper limit drive force $F_{LIMIT}$ based on a first calculation way of a FB limit drive force $F_{FB}$.

Next, with reference to FIG. 6, the technical significance of the first calculation way of the FB limit drive force $F_{FB}$ is described. The first calculation way of the FB limit drive force $F_{FB}$ is adopted in the limit state, as described above.

FIG. 6 is a diagram describing a way of calculating the upper limit drive force $F_{LIMIT}$ based on the first calculation way of the FB limit drive force $F_{FB}$. In FIG. 6, from the upper side thereof, the time series of the accelerator opening degree, the time series of the vehicle speed, the time series of the acceleration, and the time series of the respective drive forces (i.e., the FF limit drive force $F_{FF}$, the FB limit drive force $F_{FB}$, and the upper limit drive force $F_{LIMIT}$) are illustrated as an example. With respect to the time series of the vehicle speed, the time series of the actual vehicle speed and the time series of the limit vehicle speed are illustrated with a solid line and a dotted line, respectively. With respect to the time series of the acceleration, the time series of the actual acceleration and the time series of the limit acceleration are illustrated with a solid line and a dotted line, respectively.

In the example illustrated in FIG. 6, it is assumed that the limit state is formed during the period illustrated in FIG. 6. Before time t1, the accelerator opening degree is 100%, the limit vehicle speed is 90 km/h, and the actual vehicle speed is substantially 90 km/h. In the example illustrated in FIG. 6, at time t1, the limit vehicle speed is changed from 90 km/h to 100 km/h while the accelerator opening degree is kept at 100%. As a result of this, the limit vehicle speed is gradually increased to reach 100 km/h at time t3. Accordingly, the difference between the limit vehicle speed and the actual vehicle speed becomes substantially greater than 0 (see an arrow in up and down direction in FIG. 6), and the FF limit drive force $F_{FF}$ increases according to the difference between the limit vehicle speed and the actual vehicle speed, compared to the FF limit drive force $F_{FF}$ before time t1.

Further, the limit acceleration is substantially greater than the actual acceleration from time t1 to time t2, which causes the FB limit drive force $F_{FB}$ to increase from time t1 to time t2. On the other hand, the limit acceleration is substantially smaller than the actual acceleration from time t2 to time t4, which causes the FB limit drive force $F_{FB}$ to decrease from time t2 to time t4. Further, the limit acceleration is substantially greater than the actual acceleration from time t4 to time t6, which causes the FB limit drive force $F_{FB}$ to increase from time t4 to time t6. As a result of this, the upper limit drive force $F_{LIMIT}$ gradually increases from time t1 to time t2, gradually decreases until time 4 after time 3, and then increases until time 6, as illustrated in FIG. 6. As a result of this, the difference between the limit vehicle speed and the actual vehicle speed becomes substantially 0 at time t6.

In this way, according to the calculation way of the upper limit drive force $F_{LIMIT}$ based on the first calculation way of the FB limit drive force $F_{FB}$, the FF limit drive force $F_{FF}$ and the FB limit drive force $F_{FB}$ are calculated such that the difference between the limit vehicle speed and the actual vehicle speed eventually becomes 0 when the difference between the limit vehicle speed and the actual vehicle speed becomes substantially greater than 0.

Here, the drive force to be implemented in order to make the difference between the limit vehicle speed and the actual vehicle speed 0 in the limit state is not determined from the difference between the limit vehicle speed and the actual vehicle speed, and differs according to the gradient of the road on which the vehicle travels and the loaded state of the vehicle. Thus, according to a comparative configuration in which the upper limit drive force $F_{LIMIT}$ is equal to the FF limit drive force $F_{FF}$ in the limit state, it becomes difficult to make the difference between the limit vehicle speed and the actual vehicle speed 0 in some situations according to the gradient of the road on which the vehicle travels, etc. According to the embodiment, the upper limit drive force $F_{LIMIT}$ is calculated by adding the FB limit drive force $F_{FB}$, which is calculated with the first calculation way according to the difference between the limit acceleration and the actual acceleration, to the FF limit drive force $F_{FF}$ in the limit state. Control errors (a state in which the difference between the limit vehicle speed and the actual vehicle speed is relatively great is kept, for example) due to the gradient of the road on which the vehicle travels, etc., appear as the difference between the limit acceleration and the actual acceleration. Thus, according to the embodiment, the control errors due to the gradient of the road on which the vehicle travels, etc., can be reduced.

Figure 7:
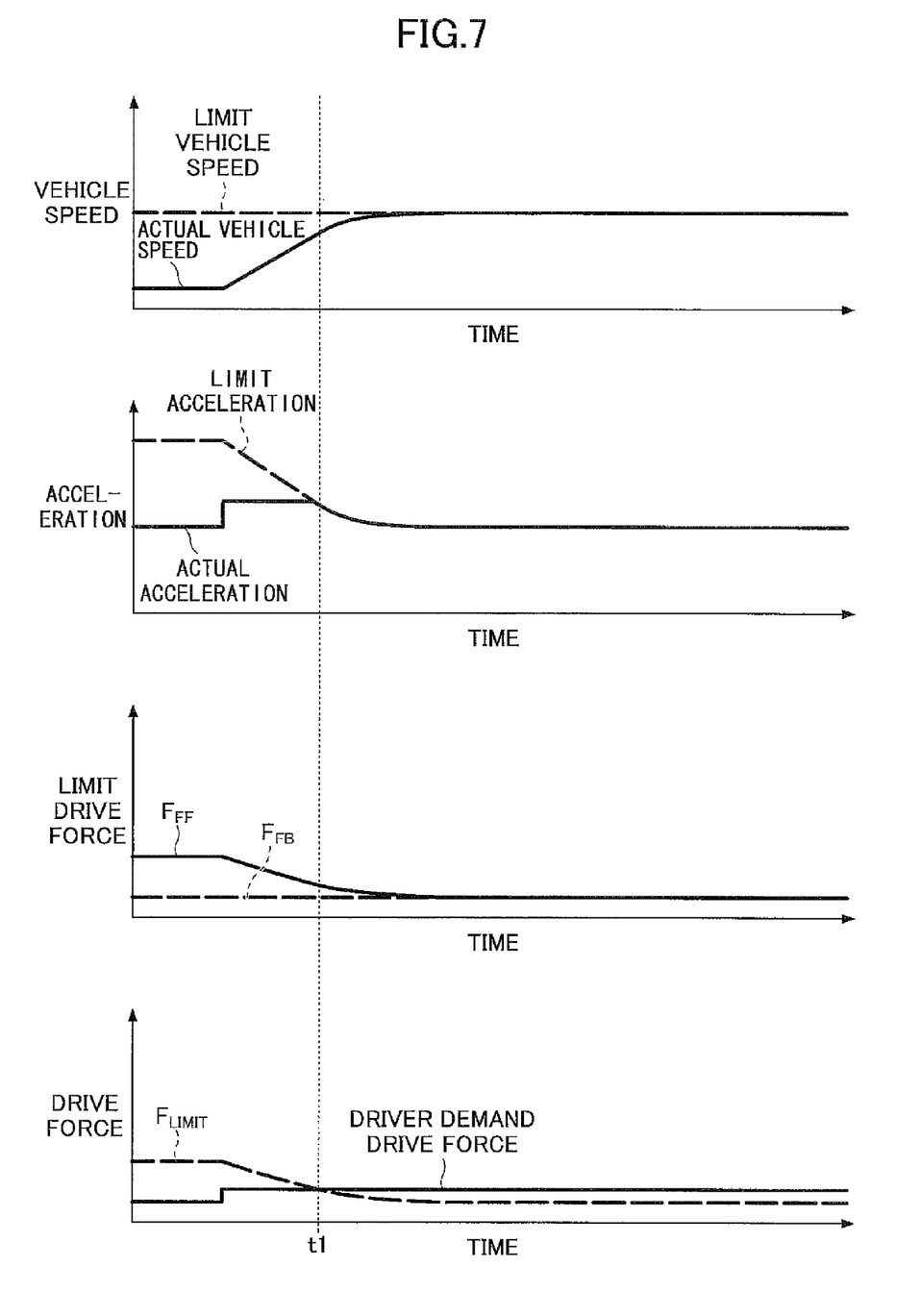
FIG. 7 is a diagram describing a way of calculating an upper limit drive force $F_{LIMIT}$ based on a second calculation way of the FB limit drive force $F_{FB}$.
Figure 8:
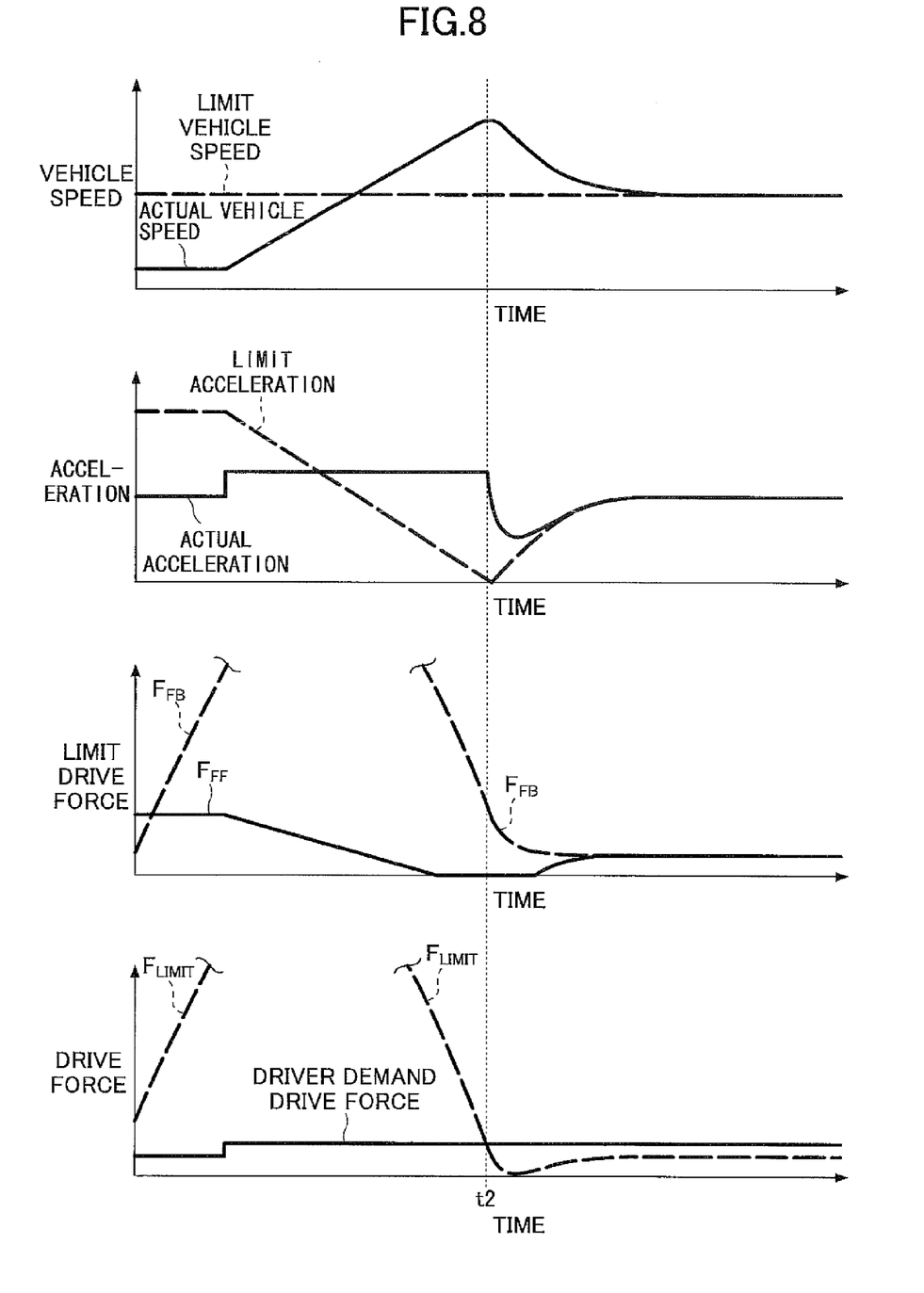
FIG. 8 is a diagram describing a comparative example.

Next, with reference to FIG. 7 and FIG. 8, the technical significance of the second calculation way of the FB limit drive force $F_{FB}$ is described. The second calculation way of the FB limit drive force $F_{FB}$ is adopted in the non-limit state, as described above.

FIG. 7 is a diagram describing a way of calculating the upper limit drive force $F_{LIMIT}$ based on the second calculation way of the FB limit drive force $F_{FB}$. In FIG. 7, from the upper side thereof, the time series of the vehicle speed, the time series of the acceleration, the time series of the limit drive forces (the FF limit drive force $F_{FF}$ and the FB limit drive force $F_{FB}$), and the time series of the drive forces (i.e., the driver demand drive force and the upper limit drive force $F_{LIMIT}$) are illustrated as an example. With respect to the time series of the vehicle speed, the time series of the actual vehicle speed and the time series of the limit vehicle speed are illustrated with a solid line and a dotted line, respectively. With respect to the time series of the acceleration, the time series of the actual acceleration and the time series of the limit acceleration are illustrated with a solid line and a dotted line, respectively. With respect to the time series of the limit drive force, the time series of the FF limit drive force $F_{FF}$ and the time series of the FB limit drive force $F_{FB}$ are illustrated with a solid line and a dotted line, respectively. With respect to the time series of the drive force, the time series of the driver demand drive force and the time series of the upper limit drive force $F_{LIMIT}$ are illustrated with a solid line and a dotted line, respectively. In the example illustrated in FIG. 7, the non-limit state is formed before time t1, and the limit state is formed after time t1.

FIG. 8 is a diagram illustrating the time series of the same parameters according to a comparative example. According to the comparative example, in the non-limit state, as in the limit state, the FB limit drive force $F_{FB}$ is calculated with the first calculation way. In the example illustrated in FIG. 8, the non-limit state is formed before time t2, and the limit state is formed after time t2.

Here, in the non-limit state, as described above, the drive force of the vehicle is controlled based on the driver demand drive force, which causes the acceleration difference between the limit acceleration and the actual acceleration to easily become relatively great. For this reason, according to the comparative example, as illustrated in FIG. 8, the FB limit drive force $F_{FB}$ calculated with the first calculation way is increased greatly due to the fact that the acceleration difference between the limit acceleration and the actual acceleration is relatively great. Accordingly, the upper limit drive force $F_{LIMIT}$ is also increased, as illustrated in FIG. 8. As a result of this, according to the comparative example, as illustrated in FIG. 8, the transition from the non-limit state to the limit state is not implemented even when the limit vehicle speed is exceeded by the actual vehicle speed, and instead the transition from the non-limit state to the limit state is implemented at time t2 when the limit vehicle speed is greatly exceeded by the actual vehicle speed. Accordingly, as illustrated in FIG. 8, a variation in the drive force immediately after the transition (i.e., a variation in the upper limit drive force $F_{LIMIT}$) also becomes relatively great. In this way, according to the comparative example, the transition from the non-limit state to the limit state is delayed, and the variation in the drive force after the transition becomes great. In other words, the smoothness at the transition from the non-limit state to the limit state is reduced.

In contrast, according to the embodiment, as described above, the FB limit drive force $F_{FB}$ is calculated with the second calculation way in the non-limit state, which can increase the smoothness at the transition from the non-limit state to the limit state, as illustrated in FIG. 7. Specifically, according to the embodiment, the FB limit drive force $F_{FB}$ calculated with the second calculation way. Thus, even when the acceleration difference between the limit acceleration and the actual acceleration is relatively great, the FB limit drive force $F_{FB}$ is calculated with the second calculation way is not increased greatly, as illustrated in FIG. 7. This is because, as described above, according to the second calculation way, the FB limit drive force $F_{FB}$ is calculated not using the limit acceleration but using the current drive force. In other words, this is because, according to the second calculation way, as apparent from the formula (2), the FB limit drive force $F_{FB}$ is calculated not using the acceleration difference between the limit acceleration and the actual acceleration, but using the acceleration difference between the acceleration (i.e., the current drive force divided by the vehicle weight) according to the current drive force and the actual acceleration. Thus, similarly, the upper limit drive force $F_{LIMIT}$ does not increase even when the acceleration difference between the limit acceleration and the actual acceleration is relatively great, as illustrated in FIG. 7. As a result of this, according to the embodiment, as illustrated in FIG. 7, the transition from the non-limit state to the limit state can be implemented at time t1 before the limit vehicle speed is exceeded by the actual vehicle speed. Accordingly, as illustrated in FIG. 7, the variation in the drive force at the time of the transition becomes relatively small. In this way, according to the embodiment, the smoothness at the transition from the non-limit state to the limit state can be increased.

The present invention is disclosed with reference to the preferred embodiments. However, it should be understood that the present invention is not limited to the above-described embodiments, and variations and modifications may be made without departing from the scope of the present invention.

For example, according to the embodiments described above, a combination of the engine 40 and the transmission 42 is used as an example of a drive force generation apparatus; however, this is not indispensable. The drive force generation apparatus may be a combination of an electric motor and the transmission, or a combination of the engine, the electric motor, and the transmission (including a reduction gear with a planetary gear train).

Further, according to the embodiments described above, as an example, the demand value related to the drive force is the demand value for the drive force itself (i.e., the driver demand drive force), and the upper limit value related to the drive force is the upper limit value for the drive force itself (i.e., the upper limit drive force). However, the demand value related to the drive force may be a demand value for the acceleration, the throttle opening degree, the drive torque, etc., as described above. For example, the demand value related to the drive force is a demand value for the acceleration (i.e., a driver demand acceleration), and the upper limit value related to the drive force is the upper limit value for the acceleration (i.e., an upper limit acceleration). In this case, the drive forces such as the driver demand drive force and the upper limit drive force may be divided by the vehicle weight to be handled in the dimension of acceleration. For example, the FB limit drive force $F_{FB}$ may be calculated as a FB limit acceleration $\alpha_{FB}$ as follows.

$$FB \text{ limit acceleration } \alpha_{FB}=(\text{current drive force})/(\text{vehicle weight})-\{(\text{actual acceleration})+(\text{travel resistance})/(\text{vehicle weight})\} \quad \text{formula (2')}$$

In this case, in the formula (2'), (current drive force)/(vehicle weight) corresponds to the driver demand drive force. The FB limit acceleration αFB thus obtained is added to a FF limit acceleration $\alpha_{FF}$ to calculate an upper limit acceleration $\alpha_{LIMIT}$. Then, the smaller of the upper limit acceleration $\alpha_{LIMIT}$ and the driver demand acceleration is selected to be converted into the dimension of drive force. It is noted that, even in such a case, the fact remains that the FB limit acceleration $\alpha_{FB}$ (and thus the upper limit acceleration $\alpha_{LIMIT}$ calculated therefrom) is calculated based on the current drive force, etc.

What is claimed is:

1. A vehicle speed limit apparatus, comprising a processor configured to:
   calculate a demand value according to an accelerator opening degree, the demand value being related to a drive force;
   obtain a limit vehicle speed;
   calculate an upper limit value based on a limit acceleration, the limit acceleration being determined according to a vehicle speed difference between the limit vehicle speed and a current vehicle speed, the upper limit value being related to the drive force;
   select a value, the value being the smaller of the demand value and the upper limit value;
   control a drive force generation apparatus to generate the drive force corresponding to the selected value; and
   correct the upper limit value (i) based on a current acceleration and the limit acceleration when the selected value corresponds to the upper limit value, and (ii) based on the current acceleration and the demand value when the selected value corresponds to the demand value.

2. The vehicle speed limit apparatus of claim 1, wherein when the selected value corresponds to the upper limit value at a certain cycle, the processor corrects the upper limit value based on the current acceleration and the limit acceleration at a next cycle, and when the selected value corresponds to the demand value at the certain cycle, the processor corrects the upper limit value based on the current acceleration and the demand value at the next cycle.

3. The vehicle speed limit apparatus of claim 2, wherein the processor calculates the upper limit value by adding a correction value to a limit value, the limit value being determined based on the limit acceleration, and
   when the selected value corresponds to the demand value at the certain cycle, the processor calculates the correction value by subtracting a sum of (a) a travel resistance, and (b) a product of the current acceleration and a vehicle weight, from a current drive force at a next cycle.

4. The vehicle speed limit apparatus of claim 3, wherein the processor uses the demand value as the current drive force.

5. The vehicle speed limit apparatus of claim 3, wherein when the selected value corresponds to the upper limit value at the certain cycle, the processor calculates the correction value based on a difference between the limit acceleration and the current acceleration at a next cycle.

* * * * *